US011242106B2

(12) United States Patent
Chen et al.

(10) Patent No.: US 11,242,106 B2
(45) Date of Patent: Feb. 8, 2022

(54) ELECTRIC BIKE HAVING IMPROVED EFFECT OF HEAT DISSIPATION

(71) Applicant: TECHWAY INDUSTRIAL CO., LTD., Taichung (TW)

(72) Inventors: Hong-Fang Chen, Taichung (TW); Wei-Ting Chen, Taichung (TW); Wei-Lin Hsu, Taichung (TW); Ju-Sheng Cheng, Taichung (TW); Teng-Mao Hong, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 247 days.

(21) Appl. No.: 16/430,691

(22) Filed: Jun. 4, 2019

(65) Prior Publication Data

US 2020/0385080 A1 Dec. 10, 2020

(51) Int. Cl.
| | |
|---|---|
| *B62M 7/02* | (2006.01) |
| *B62K 11/04* | (2006.01) |
| *F28F 13/06* | (2006.01) |
| *B60L 50/64* | (2019.01) |
| *B62J 43/00* | (2020.01) |
| *B62J 99/00* | (2020.01) |

(52) U.S. Cl.
CPC ............ *B62J 99/00* (2013.01); *B60L 50/64* (2019.02); *B62K 11/04* (2013.01); *B62M 7/02* (2013.01); *F28F 13/06* (2013.01); *B60L 2200/12* (2013.01); *B62J 43/00* (2020.02)

(58) Field of Classification Search
CPC ....... B62M 7/02; F28F 13/06; B60L 2200/12; B60L 58/26; B60L 50/64; B62J 43/00
See application file for complete search history.

(56) References Cited

U.S. PATENT DOCUMENTS

| | | | | |
|---|---|---|---|---|
| 3,954,145 | A * | 5/1976 | Nesbit | B62M 7/02 180/230 |
| 7,556,115 | B2 * | 7/2009 | Iwanaga | F02M 35/162 180/229 |
| 7,882,911 | B2 * | 2/2011 | Nobuhira | B62M 7/02 180/68.1 |
| D698,702 | S * | 2/2014 | Kubanek | D12/110 |
| 2003/0213631 | A1 * | 11/2003 | Schless | B62K 19/48 180/220 |
| 2004/0050603 | A1 * | 3/2004 | Jaeger | B62K 3/002 180/181 |
| 2015/0075883 | A1 * | 3/2015 | Ward | A63C 17/12 180/65.6 |
| 2020/0398934 | A1 * | 12/2020 | McDonald | B62M 7/02 |

* cited by examiner

*Primary Examiner* — Tony H Winner
(74) *Attorney, Agent, or Firm* — Muncy, Geissler, Olds & Lowe, P.C.

(57) ABSTRACT

An electric bike having an improved effect of heat dissipation has a body, a driving device, and a battery. The body has a frame, a rear wheel, and a front wheel, wherein the rear wheel and the front wheel are mounted to the frame. The driving device is mounted to the body and has a motor and a shell. The motor is connected with the frame and has a front end near the front wheel and a rear end near the rear wheel. The shell covers the motor and has multiple inlets and multiple outlets disposed therethrough. The multiple inlets are located near the front end of the motor. The multiple outlets are located near the rear end of the motor. The battery is electrically connected to the motor. The front wheel, the battery, the motor, and the rear wheel are serially aligned.

2 Claims, 7 Drawing Sheets

ELECTRIC BIKE HAVING IMPROVED EFFECT OF HEAT DISSIPATION

BACKGROUND OF THE INVENTION

1. Field of the Invention

The present invention relates to an electric bike, and more particularly to an electric bike that has an improved effect of heat dissipation.

2. Description of Related Art

An electric bike is a transportation vehicle that can be driven by electric power, so that a cyclist may travel fast without losing much physical energy. A conventional electric bike comprises a battery, a motor, and a reducer, which are connected together and further connected to a frame and a rear wheel of the conventional electric bike, to drive the conventional electric bike. Thus the battery's configuration and heat dissipation become a key point to design and produce the conventional electric bike. The battery and the motor are covered by a sealed shell of the conventional electric bike. As a result, it is a pity that air flowing through the conventional electric bike during riding has not been used to dissipate waste heat produced by the battery and the motor.

Furthermore, the battery of the conventional electric bike fits in a tube of the frame, i.e. the battery is specifically dedicated to the conventional electric bike, and cannot be applied to other products. Due to this, the conventional electric bike has a defect of high battery cost as well.

To overcome the shortcomings, the present invention tends to provide an electric bike having an improved effect of heat dissipation to mitigate or obviate the aforementioned problems.

SUMMARY OF THE INVENTION

The main objective of the present invention is to provide an electric bike having an improved effect of heat dissipation to overcome the aforementioned problems of the conventional electric bike.

The electric bike having an improved effect of heat dissipation has a body, a driving device, and a battery. The body has a frame, a rear wheel, and a front wheel, wherein the rear wheel and the front wheel are mounted to the frame. The driving device is mounted to the body and has a motor and a shell. The motor is connected with the frame and has a front end near the front wheel and a rear end near the rear wheel. The shell covers the motor and has multiple inlets and multiple outlets disposed therethrough. The multiple inlets are located near the front end of the motor. The multiple outlets are located near the rear end of the motor. The battery is electrically connected to the motor. The front wheel, the battery, the motor, and the rear wheel are serially aligned.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
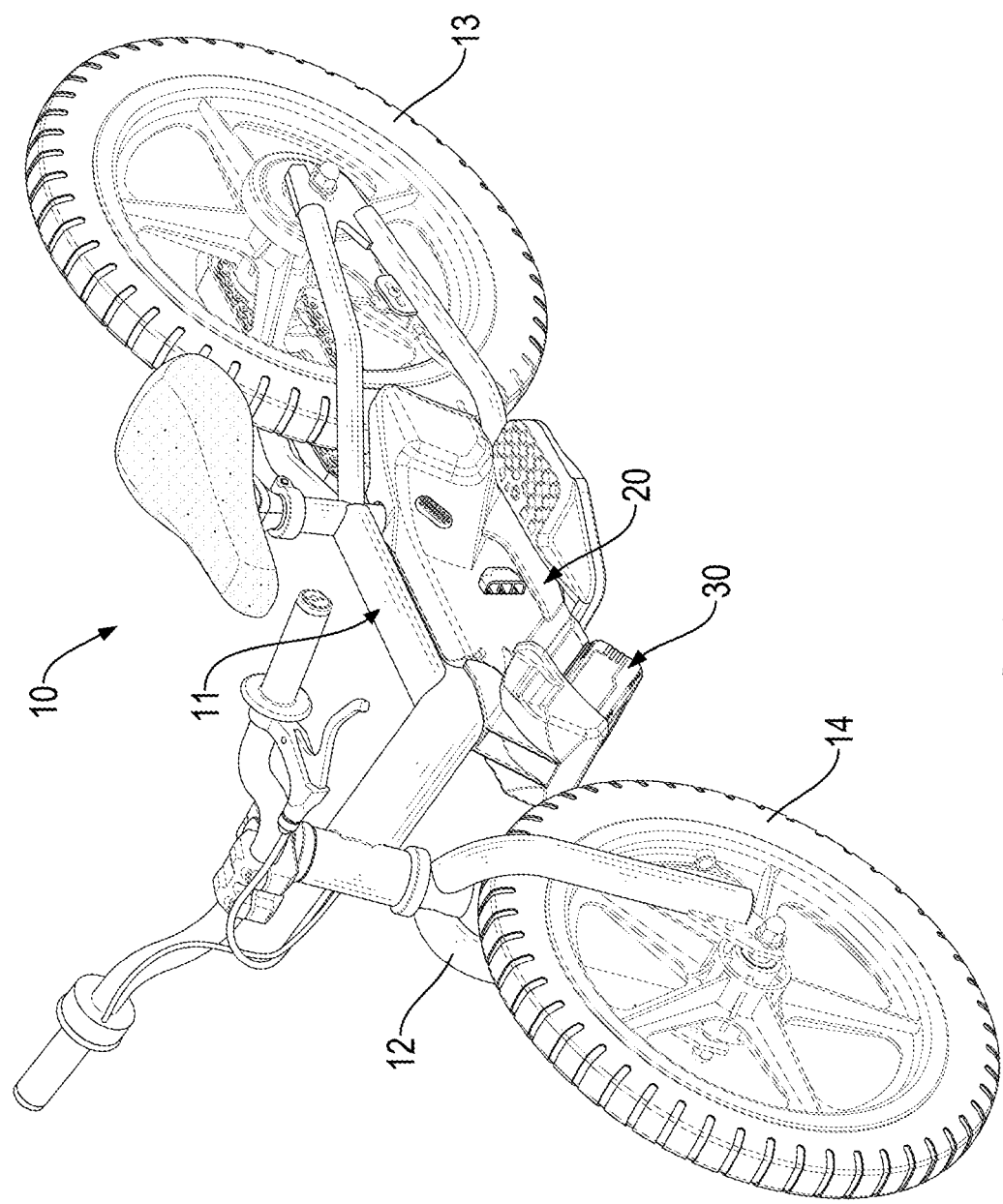
FIG. 1 is a perspective view of an electric bike having an improved effect of heat dissipation in accordance with the present invention.
Figure 2:
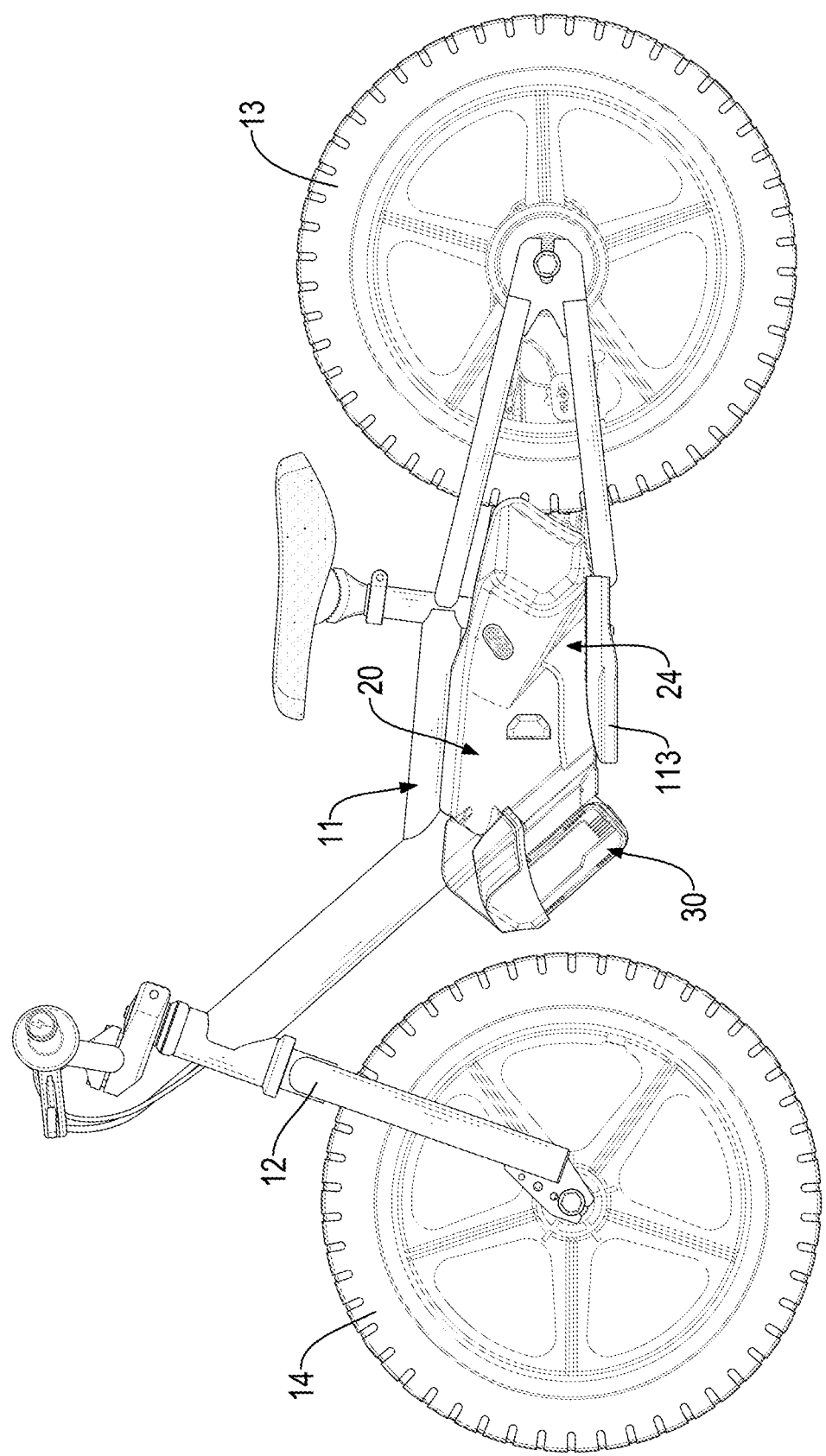
FIG. 2 is a side view of the electric bike in FIG. 1.

An electric bike having an improved effect of heat dissipation may be a cross-country bike for children. With reference to FIGS. 1 and 2, the electric bike having an improved effect of heat dissipation in accordance with the present invention comprises a body 10, a driving device 20, and a battery 30.

Figure 3:
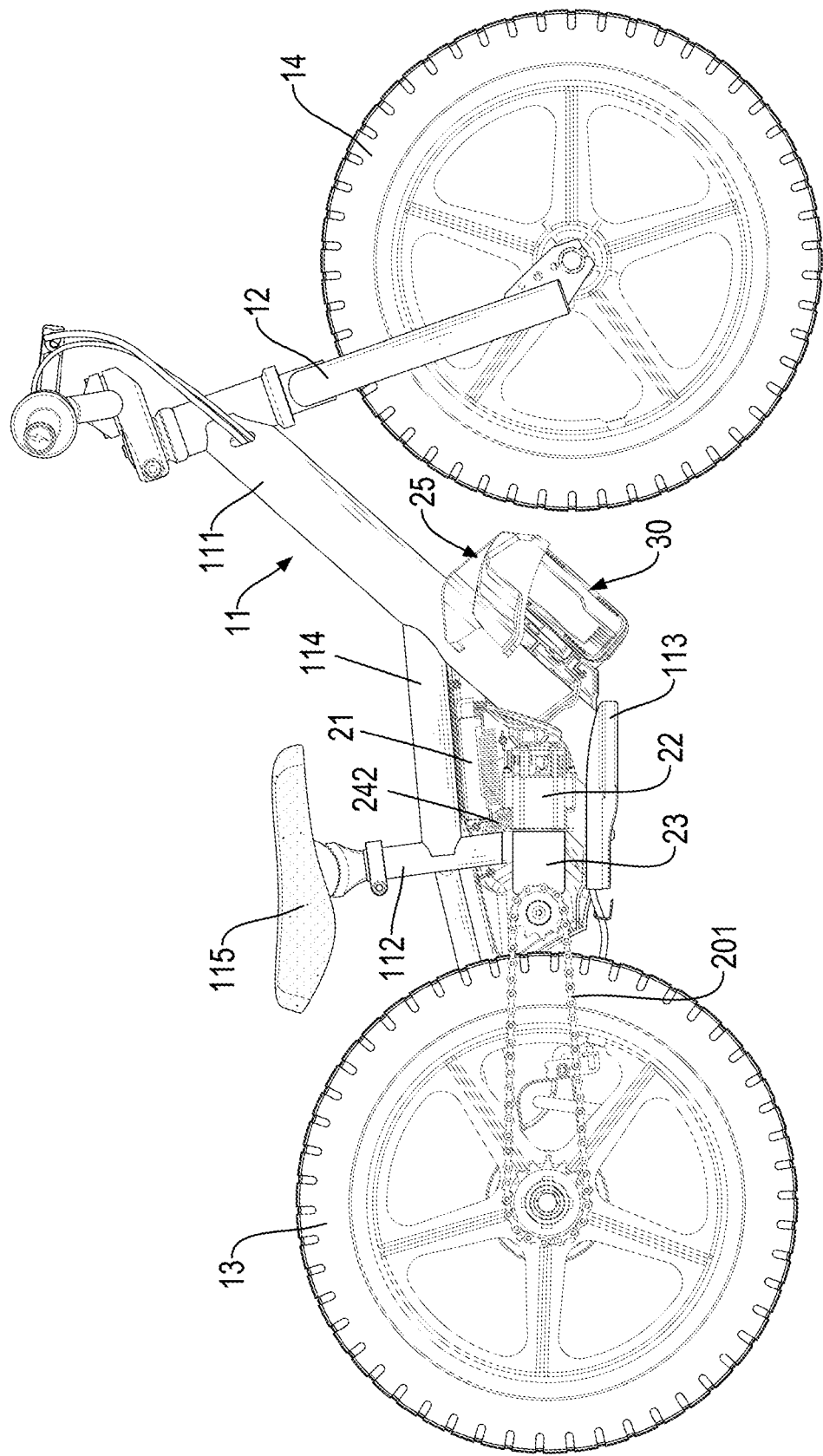
FIG. 3 is another side view of the electric bike in FIG. 1.
Figure 4:
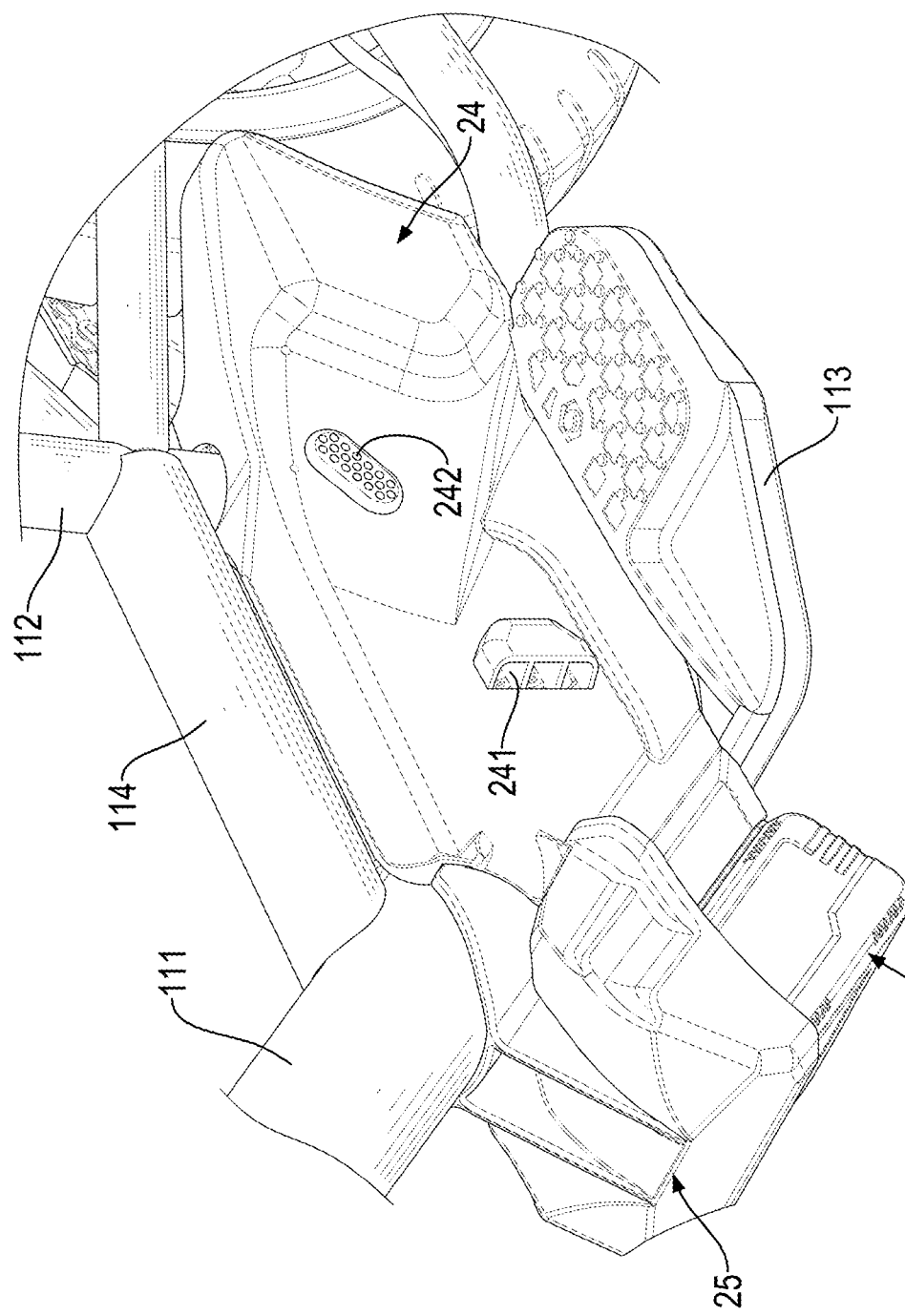
FIG. 4 is an enlarged perspective view of the electric bike in FIG. 1.

With reference to FIGS. 1 to 4, the body 10 has a frame 11, a fork 12, a rear wheel 13, and a front wheel 14. With reference to FIGS. 3 and 4, the frame 11 comprises a down tube 111, a seat tube 112, and two footrests 113. The down tube 111 extends obliquely. The seat tube 112 is connected to the down tube 111 via a top tube 114, and has a seat 115 fixed at a top of the seat tube 112. With reference to FIGS. 2 and 3, the two footrests 113 are respectively located on a left side and a right side of the frame 11. A rear end of the down tube 111 is connected between the two footrests 113. Furthermore, the two footrests 113 are located lower than the seat tube 112 and the seat 115, so a cyclist may sit on the seat 115 and step on the two footrests 113.

The fork 12 is pivotally mounted to a front end of the down tube 111 of the frame 11. The rear wheel 13 is rotatably mounted to the frame 11, and is located behind the seat tube 112 and the two footrests 113. For convenience of description, where the frame 11 and the rear wheel 13 are mounted together, namely a seat stay and a chain stay of the frame 11, is omitted in FIG. 3. The front wheel 14 is rotatably mounted to the fork 12, and is located in front of the frame 11.

With reference to FIGS. 2 and 3, the driving device 20 is mounted to the frame 11 of the body 10, is located between the two footrests 113, and is located between the front wheel 14 and the rear wheel 13. The driving device 20 has a controller 21, a motor 22, a reducer 23, a shell 24, and a battery connector 25. The controller 21 is located between the down tube 111, the top tube 114, and the seat tube 112, and the controller 21 may be a control board. The motor 22 is electrically connected to the controller 21, and is located behind the down tube 21 between the top tube 114 and the two footrests 113. The motor 22 has a front end near the front wheel 14 and a rear end near the rear wheel 13. Besides, the motor 22 is a motor of an electric hand tool. The reducer 23 is connected to the rear end of the motor 22, and is connected to the rear wheel 13 via a chain 201. The motor 22, the reducer 23, the chain 201, and the rear wheel 13 are serially aligned from front to rear.

Figure 5:
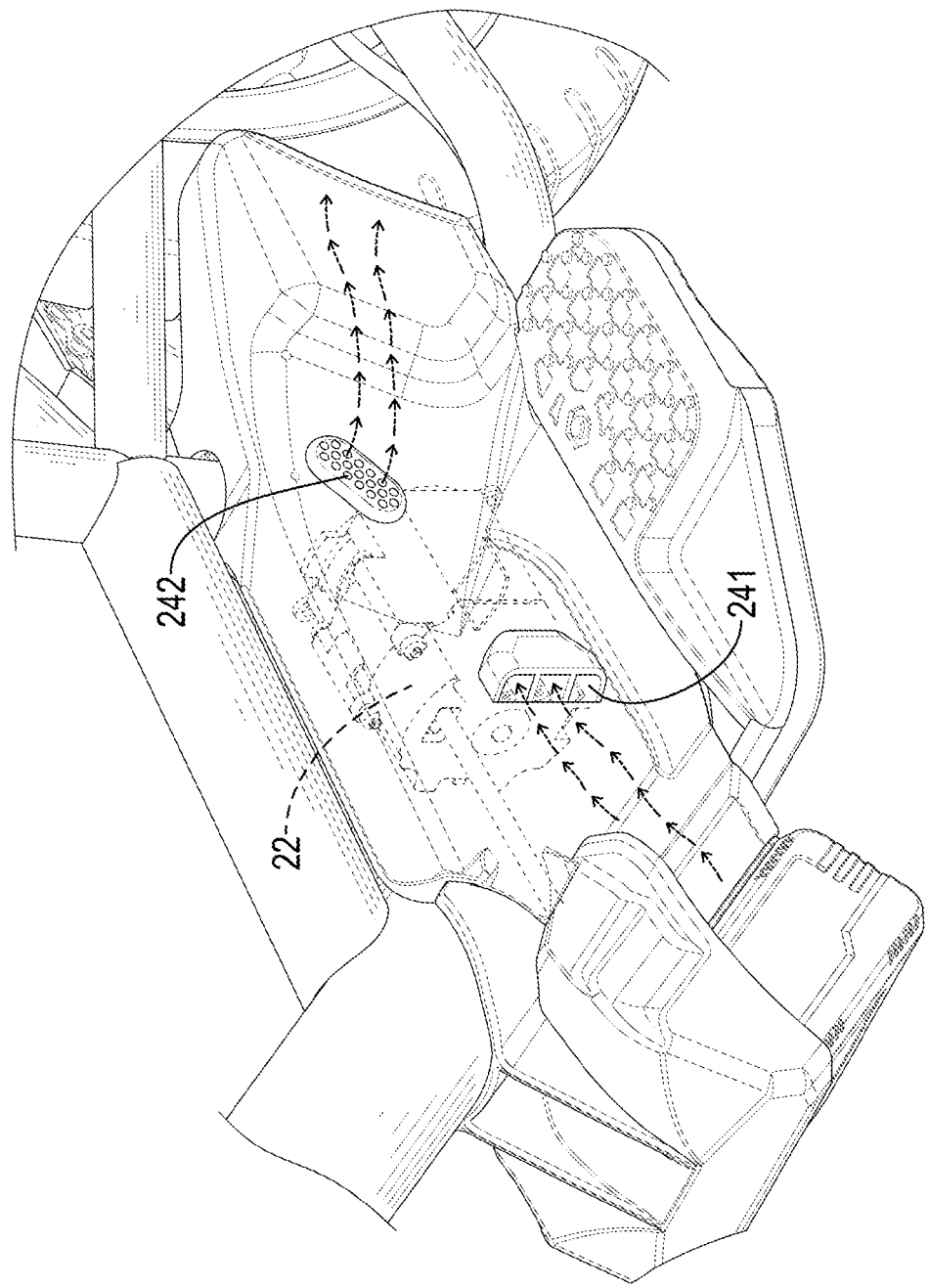
FIG. 5 is an operational and enlarged perspective view of the electric bike in FIG. 1, showing how air flow dissipates heat produced by a motor of the electric bike.

With reference to FIGS. 2, 4, and 5, the shell 24 is mounted on the frame 11, and covers the controller 21, the motor 22, and the reducer 23. For convenience of description, the shell 24 is partially omitted in FIG. 3. The shell 24 has multiple inlets 241 and multiple outlets 242 disposed therethrough. Moreover, the multiple inlets 241 are located near the front end of the motor 22, and the multiple outlets 242 are located near the rear end of the motor 22.

Figure 6:
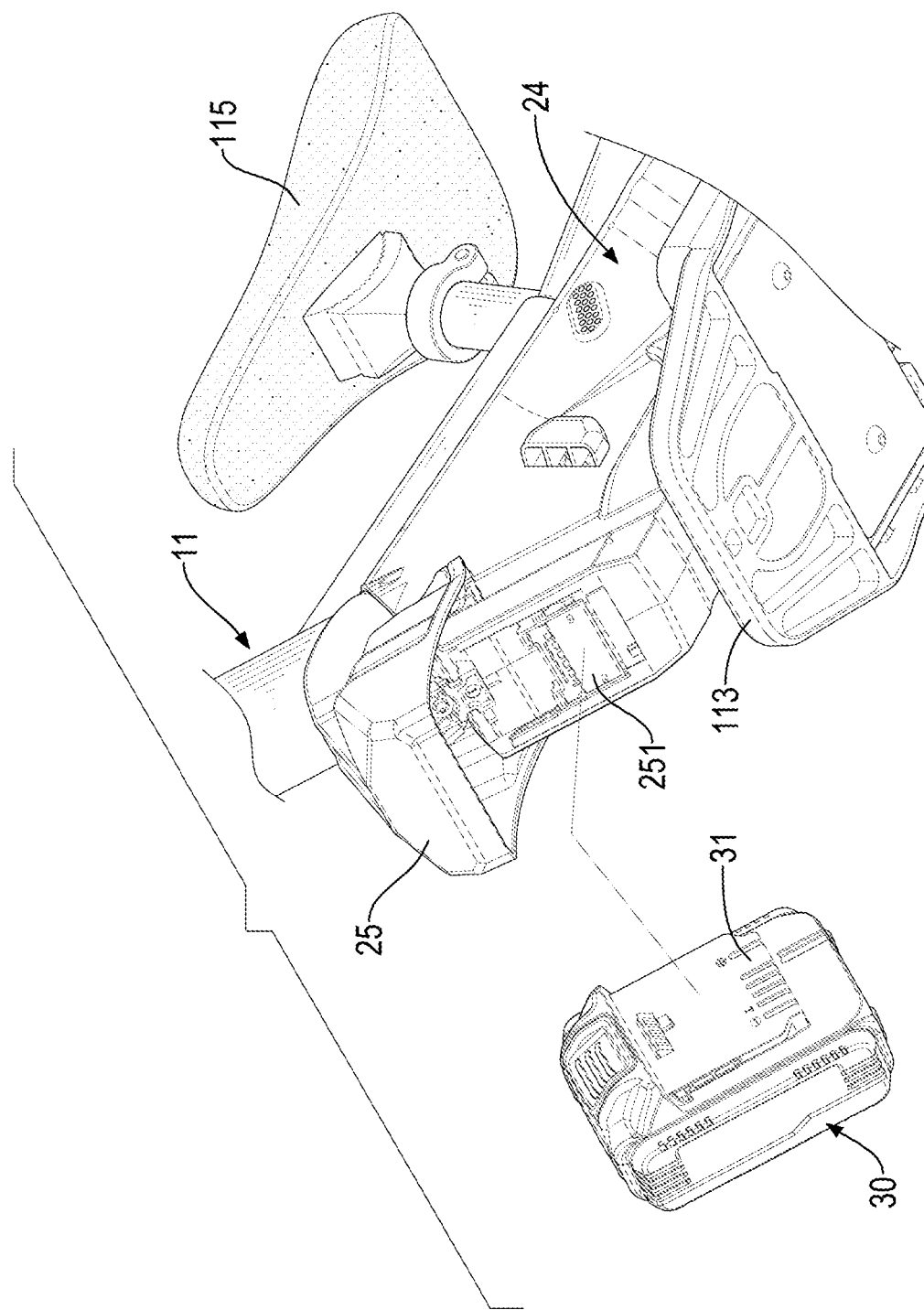
FIG. 6 is an enlarged exploded perspective view of the electric bike in FIG. 1.
Figure 7:
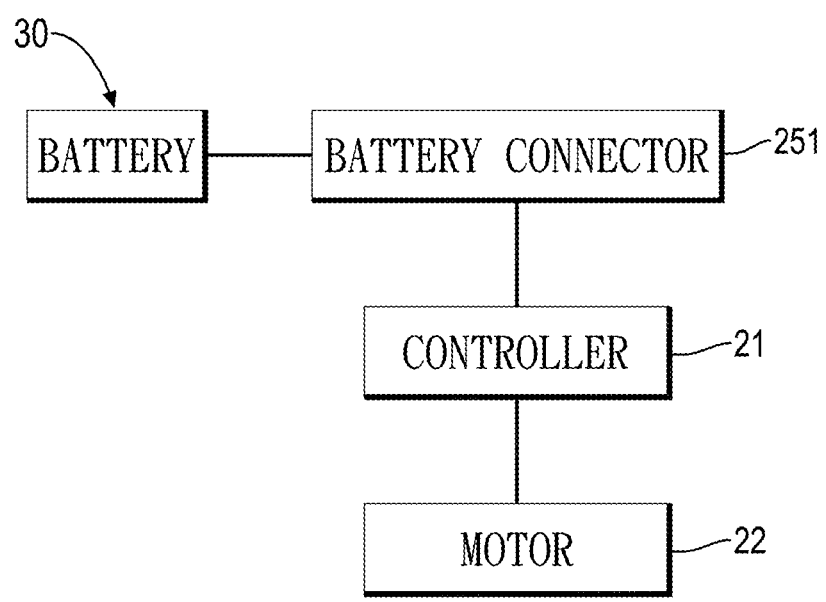
FIG. 7 is a block diagram of the electric bike in FIG. 1, showing an electrical connection of the electric bike.

With reference to FIGS. 3 to 6, the battery connector 25 is mounted to the down tube 111 of the frame 11, is located ahead of the motor 22, and aligns with the motor 22 and the reducer 23. With reference to FIGS. 6 and 7, the battery connector 25 has a connecting portion 251, which is electrically connected to the controller 21.

With reference to FIG. 6, the battery 30 is detachably mounted to the battery connector 25 of the driving device 20. The front wheel 14, the battery 30, the motor 22, the reducer 23, and the rear wheel 13 are thereby serially aligned from front to rear. The battery 30 is a battery of an electric hand tool. The battery 30 has an output terminal 31, and the output terminal 31 is combined with the connecting portion 251 of the battery connector 25 when the battery 30 is mounted to the battery connector 25. Consequently, electric power stored by the battery 30 may be transmitted through the connecting portion 251 and the controller 21 to the motor 22, and actuates the motor 22. The motor 22 may therefore provide kinetic energy to rotate the rear wheel 13 via the reducer 23 and the chain 201. Working principles of the electric bike having an improved effect of heat dissipation are the same with those of the conventional electric bike, so further description is omitted.

With the aforementioned technical features, the electric bike having an improved effect of heat dissipation has the following advantages.

1. The front wheel 14, the battery 30, the motor 22, the reducer 23, and the rear wheel 13 are serially aligned. Components of the driving device 20 are thereby streamlined, and space in the shell 24 is highly utilized. When the cyclist rides the electric bike having an improved effect of heat dissipation and advances, air flows through the battery 30 and cools down the battery 30. Then the air flows into the shell 24 through the multiple inlets 241, flows through the motor 22 and dissipates heat thereof, and leaves the shell 24 through the multiple outlets 242. As a result, an effect of heat dissipation may be provided to the battery 30 and the motor 22.

2. The motor 22 and the battery 30 are the motor and the battery of an electric hand tool, so producing cost of the motor 22 and the battery 30, such as design and molding, may be saved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electric bike having an improved effect of heat dissipation, the electric bike comprising:
a body having a frame, a rear wheel, and a front wheel, wherein the rear wheel and the front wheel are mounted to the frame;
a driving device mounted to the body and having
a motor connected with the frame and having
a front end located near the front wheel; and
a rear end located near the rear wheel; and
a shell covering the motor and having
multiple inlets disposed through the shell and located near the front end of the motor; and
multiple outlets disposed through the shell and located near the rear end of the motor; and
a battery electrically connected to the motor;
wherein the front wheel, the battery, the motor, and the rear wheel are serially aligned;
the battery is a battery of an electric hand tool;
the driving device has
a controller covered by the shell and electrically connected to the motor; and
a battery connector connected to the frame in front of the motor and having
a connecting portion electrically connected to the controller and the battery.

2. An electric bike having an improved effect of heat dissipation, the electric bike comprising:
a body having a frame, a rear wheel, and a front wheel, wherein the rear wheel and the front wheel are mounted to the frame;
a driving device mounted to the body and having
a motor connected with the frame and having
a front end located near the front wheel; and
a rear end located near the rear wheel; and
a shell covering the motor and having
multiple inlets disposed through the shell and located near the front end of the motor; and
multiple outlets disposed through the shell and located near the rear end of the motor; and
a battery electrically connected to the motor;
wherein the front wheel, the battery, the motor, and the rear wheel are serially aligned;
the driving device has a reducer connected to the rear end of the motor and connected to the rear wheel via a chain;
the battery is a battery of an electric hand tool;
the driving device has
a controller covered by the shell and electrically connected to the motor; and
a battery connector connected to the frame in front of the motor and having
a connecting portion electrically connected to the controller and the battery.

* * * * *